(12) United States Patent
Atkins et al.

(10) Patent No.: US 6,322,214 B1
(45) Date of Patent: *Nov. 27, 2001

(54) COLORED CONTACT LENSES THAT ENHANCE COSMETIC APPEARANCE OF DARK-EYED PEOPLE

(75) Inventors: Barry L. Atkins, Chicago, IL (US); Michael H. Quinn, Valparaiso, IN (US)

(73) Assignee: Wesley Jessen Corporation, Des Plaines, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/677,832

(22) Filed: Sep. 29, 2000

Related U.S. Application Data

(63) Continuation of application No. 09/148,174, filed on Sep. 4, 1998, now Pat. No. 6,132,043.

(51) Int. Cl.$^7$ ................................................. G02C 7/04
(52) U.S. Cl. ................................. 351/162; 351/177
(58) Field of Search ........................... 351/160 R, 160 H, 351/161, 162, 177

(56) References Cited

U.S. PATENT DOCUMENTS

| | | |
|---|---|---|
| 3,536,386 | 10/1970 | Spivack . |
| 3,679,504 | 7/1972 | Wichterle . |
| 3,712,718 | 1/1973 | LeGrand et al. . |
| 4,405,773 | 9/1983 | Loshaek et al. . |
| 4,460,523 | 7/1984 | Neefe . |
| 4,582,402 | 4/1986 | Knapp . |
| 4,634,449 | 1/1987 | Jenkins . |
| 4,668,240 | 5/1987 | Loshaek . |
| 4,719,657 | 1/1988 | Bawa . |
| 4,744,647 | 5/1988 | Meshel et al. . |
| 5,034,166 | 7/1991 | Rawlings et al. . |
| 5,116,112 | 5/1992 | Rawlings . |
| 5,120,121 | 6/1992 | Rawlings et al. . |
| 5,414,477 | 5/1995 | Jahnke . |
| 6,132,043 * | 10/2000 | Atkins et al. ............... 351/162 |

FOREIGN PATENT DOCUMENTS

| | | |
|---|---|---|
| 0 309 154 B1 | 3/1989 | (EP) . |
| 0 472 496 A2 | 2/1992 | (EP) . |
| 2 202 540 A | 9/1988 | (GB) . |

* cited by examiner

*Primary Examiner*—Scott J. Sugarman
(74) *Attorney, Agent, or Firm*—Steven P. Shurtz; Brinks Hofer Gilson & Lione

(57) ABSTRACT

A colored contact lens comprising a non-opaque pupil section, an iris section surrounding the pupil section. A colored, opaque, intermittent pattern is deposited over the iris section using opaque elements which are indiscernible to the ordinary viewer. The elements of the pattern are of a shade which provides a contact lens capable of making subtle changes or enhancements to the color of the iris of a dark-eyed person while imparting a very natural appearance.

20 Claims, 2 Drawing Sheets

COLORED CONTACT LENSES THAT ENHANCE COSMETIC APPEARANCE OF DARK-EYED PEOPLE

This appication is a continuation of application Ser. No. 09/148,174, filed Sep. 4, 1998, now U.S. Pat. No. 06,132,083.

TECHNICAL FIELD

The present invention relates to colored contact lenses, and in particular to color contact lenses having opaque colored portions corresponding to the iris portion of the human eye such that when the lenses are placed on the eye of a dark-eyed person, the lenses are capable of making subtle changes to the color of the human eye and thereby enhancing the color of the eyes of the dark-eyed person.

BACKGROUND OF THE INVENTION

Over the years many attempts have been made to modify or enhance the color of one's eyes using colored contact lenses with varying degrees of success. Attempts to produce an opaque lens with a natural appearance are disclosed in. U.S. Pat. Nos. 3,536,386, (Spivak); 3,679,504 (Wichterle); 3,712,718 (LeGrand), 4,460,523 (Neefe), 4,719,657 (Bawa), 4,744,647 (Meshel et al.), 4,634,449 (Jenkins); European Patent Publication No. 0 309 154 (Allergan) and U.K. Patent Application No. 2 202 540 A (IGEL).

Commercial success was achieved by the colored contact lens described in Knapp (in U.S. Pat. No. 4,582,402) which discloses a contact lens having, in its preferred embodiment, colored, opaque dots. The Knapp lens provides a natural appearance with a lens that is simple and inexpensive to produce, using a simple one-color printed dot pattern. Although, in Knapp, the intermittent pattern of dots does not fully cover the iris, the invention provides a sufficient density of dots that a masking effect gives the appearance of a continuous color when viewed by an ordinary observer. Knapp also discloses that the printing step may be repeated one or more-times using different patterns in different colors, since upon close examination the iris's of many persons are found to contain more than one color. The printed pattern need not be absolutely uniform, allowing for enhancement of the fine structure of the iris. The one-color Knapp lenses currently achieving commercial success have their dots arranged in an irregular pattern to enhance the structure of the iris. However, neither the Knapp commercial lenses, nor the Knapp patent disclose or suggest a contact lens designed for the person having dark-colored eyes in which the colored contact lens provides a subtle change or enhancement to the eyes of a dark-eyed person.

Various efforts have been made to improve on the Knapp lens. U.S. Pat. No. 5,414,477 to Jahnke discloses the application of the intermittent ink pattern in two or more portions of distinct shades of colorant to provide a more natural appearance.

Other attempts to create a more natural appearing lens include U.S. Pat. No. 5,120,121 to Rawlings which discloses a cluster of interconnecting lines radiating from the periphery of the pupil portion to the periphery of the iris portion. Further, European Patent No. 0 472 496 A2 shows a contact lens having a pattern of lines that attempts to replicate the lines found in the iris.

Although many attempts have been made to create colored contact lenses that change or modify the color of the iris, none of the colored contact lenses have addressed the particular subtle change or enhancement required by a person having dark-eyes who wants a subtle enhancement rather than a dramatic change in eye color.

SUMMARY OF THE INVENTION

The present invention is based on the surprising discovery that certain opaque patterns on colored contact lenses can achieve a subtle enhancement to the appearance of the iris for people having dark-colored irises, or dark-eyed people. The improvement in appearance for dark-eyed people over existing lenses using different colors of existing patterns and different patterns altogether is startling. Unlike previous one and two color lenses, the lenses of this invention are able to cause subtle change or enhancement to the color of the dark-eyed wearer's iris, i.e. a brown-eyed person. Although the preferred embodiment of the invention is a dot pattern, other patterns are contemplated.

One objective of the invention is to provide a colored contact lens with a non-opaque pupil section, an iris section surrounding said pupil section, and a colored, opaque intermittent pattern over the entire iris section, the elements of said pattern being opaque and indiscernible to the ordinary viewer. The elements of the pattern are of a shade, such as red, mahogany, light hazel or starburst hazel which provides a lens capable of making subtle changes or enhancements to the color of the iris of a dark-eyed person wearing the lens while imparting a very natural appearance.

Another objective of the invention is to provide a colored contact lens comprising a non-opaque pupil section, an iris section surrounding said pupil section, and a colored, opaque intermittent pattern over the iris section that leaves a substantial portion of the pattern non-opaque, said pattern covering at least about 15 percent of the area of said iris section. The pattern is made up of opaque elements of colorant, in a pattern which is a plurality of radial stripes stretching from the non-opaque pupil section to the outer periphery of the iris section. Each radial stripe is bounded on each side by a non-opaque portion, such that each non-opaque portion and each radial stripe cover the same approximate area, thereby providing a lens capable of making a subtle change and enhancing the color of the iris of a person having dark colored eyes while importing a very natural appearance.

Another objective of the invention is to provide a colored contact lens with a non-opaque pupil section, an iris section surrounding the pupil section, and a colored, opaque intermittent pattern over the iris section, that leaves a substantial portion within the interstices of the pattern non-opaque, the pattern covering at least about 15 percent of the area of said iris section. The elements of the pattern are opaque and indiscernible to the ordinary viewer. The elements of the pattern, which is a starburst, is located generally on the inner portion of the iris section of the contact lens adjacent to the non-opaque pupil section and has an uneven border at its outer end. The uneven border is a minimum distance of about 5% to about 60% of the radial width of said iris section, and the maximum distance of the uneven border from the outer perimeter of said iris section is from about 25% to about 90% of the radial width of said iris section, thereby providing a lens capable of making subtle changes or enhancements to the color of the iris of a dark-eyed person wearing the lens while imparting a very natural appearance.

Another objective of the invention is to provide printing methods for manufacturing the above-described and similar contact lenses.

The term "non-opaque" as used herein is intended to describe a part of the lens that is uncolored or colored with translucent coloring.

The term "ordinary viewer" is intended to mean a person having normal 20—20 vision standing about 5 feet from a person wearing the lenses of this invention.

DETAILED DESCRIPTION OF THE PREFERRED EMBODIMENTS

Figure 1:
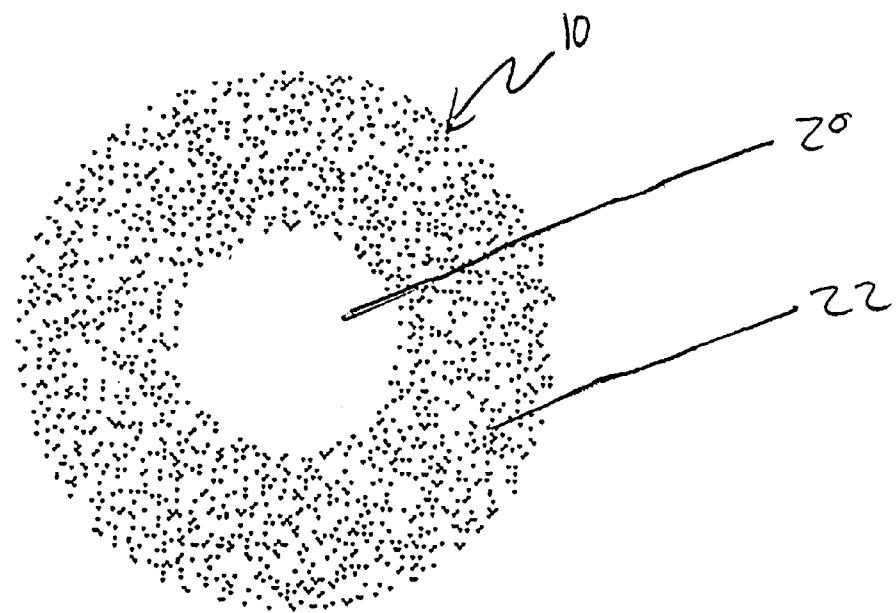
FIG. 1 illustrates a contact lens pattern in accordance with the present invention.

FIG. 1 shows a contact lens 10 in accordance with the present invention. It has a non-opaque pupil section 20 in the center of lens. This pupil section corresponds to the pupil section of the human eye such that when the contact lens is placed on the eye, the pupil section of the contact lens will come in contact with the pupil of the eye. The contact lens 10 also has an annular iris section 22 surrounding the pupil section. This iris section 22 corresponds to the iris section of the human eye, such that when the contact lens 10 is placed in contact with the human eye, the iris section 22 will cover the iris section of the eye. For hydrophilic lenses, peripheral section (not shown) surrounds iris section 22. A colored, opaque, intermittent pattern is located over the entire iris section 22, as show in FIG. 1. The pattern leaves a substantial portion of the iris section within the interstices of the pattern non-opaque. The non-opaque areas of the iris section 22 appear white in FIG. 1, and appear clear on the actual contact lens.

The elements of the pattern are preferably opaque dots. Certain portions of the iris section 22 may be more of less densely covered with dots than other portions. This arrangement enhances the structure of the iris of a person wearing the lens.

Of course, the opaque pattern may be comprised of dots having any shape, regular or irregular, such as round, square, hexagonal, elongated, etc. Further, the elements of the pattern may have a shape other than dots, so long as the elements are undescrinable to the ordinary viewer, cover at least about 15 percent of the iris, and leave a substantial portion of the iris section within the interstices of the pattern non-opaque.

The improvement of this invention is the use of certain opaque inks along with particular patterns and coverage of the iris section of the contact lens that provides subtle changes or enhancements to the appearance of the iris of a person having dark colored eyes, such as dark brown, while providing a natural appearance. To produce this color pattern according to the preferred embodiment, particularly colored dots (or some other element) are printed on the iris section of the contact lens in a pattern that covers the iris section while leaving certain areas of the iris section non-opaque.

Although many colors may be utilized to enhance the appearance of the iris, the particular colors used to create the subtle changes or enhancements to the eye of a dark-eyed person include starburst hazel, mahogany, light hazel, and red.

These ink pastes can be made in a number of different ways. For example, a red ink paste can be made using 67.50 percent binder (by weight), 22.50 percent ethyl lactate, and 10.00 percent iron oxide red. A mahogany ink paste can be made from 52.00% binder (by weight), 18 percent ethyl lactate, 4.42 percent titanium dioxide, 4.8 percent iron oxide black, 13.28 percent iron oxide brown and 7.50 percent iron oxide red. A light hazel ink paste can be made using a mixture of 57.52 percent binder (by weight), 18.21 percent ethyl lactate, 1.77 percent titanium dioxide, 0.06 percent PCN blue, 17.69 percent iron oxide yellow and 4.55 percent iron oxide red. A hazel ink paste can be made using 65.35 percent binder (by weight), 21.23 percent ethyl lactate, 0.73 percent titanium dioxide, 0.07 percent PCN blue, 10.77 percent iron oxide yellow, and 1.85 percent iron oxide red. Different percentages of the particular ingredients may be used and still obtain an enhancing effect. In some cases at least about +/−10% range may be employed. For red colorant, which in the preferred embodiment uses iron oxide red, a greater range of percentage may be used.

Although these colors are preferred, other colors with similar hues may be used as replacements, providing similar results. For example, opaque inks such as titanium dioxide, red, yellow or brown ink oxides; PCM blue or green mixed with titanium dioxide; calcium carbonate, zinc oxide can be used as effectively as the colors described above. Further, pigment percentages or loads may be increased or decreased depending on the color preferences with corresponding adjustments made to the binder and ethyl lactate percentages to adjust for viscosity.

Figure 2:
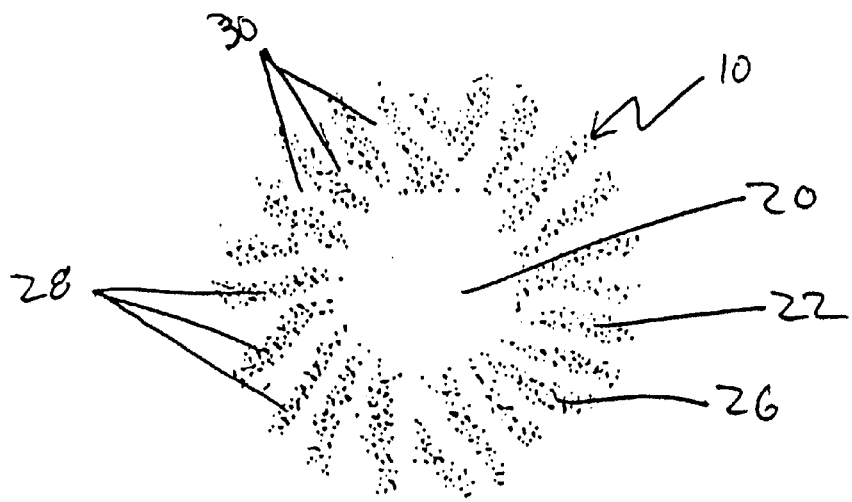
FIG. 2 illustrates a contact lens pattern in accordance with an alternative embodiment of the present invention.

In FIG. 2, another embodiment of the present invention is disclosed. The contact lens pattern illustrated has a non-opaque pupil section 20, an iris section 22 surrounding the pupil section, and a colored, opaque intermittent pattern 26 over the entire iris section 22 that leaves a substantial portion of the pattern non-opaque. The pattern 26 covers at least about 15 percent of the area of the iris section, and is made up of a plurality of radial stripes 28 stretching from the junction of the pupil section and the iris section to the periphery of the iris section. Each radial stripe may be made up of a uniform or non-uniform opaque dots or other shapes. Each radial stripe is bounded on each side by a non-opaque iris portion 30, such that each non-opaque iris portion and each radial stripe cover the same approximate area. The pattern 26 when printed on a contact lens providing a lens capable of making a subtle change or enhancement to the iris of a person having dark colored eyes.

Figure 3:
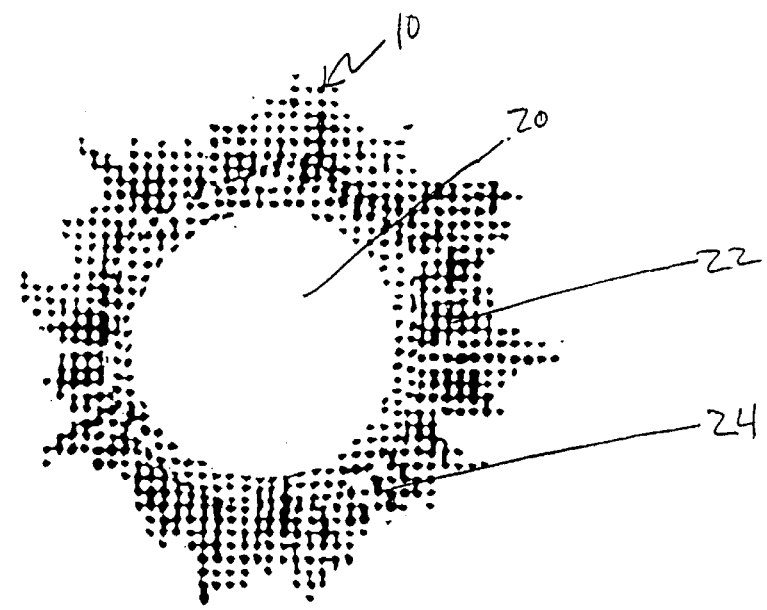
FIG. 3 illustrates a contact lens pattern in accordance with an alternative embodiment of the present invention.

FIG. 3 shows yet another embodiment of the present invention in which a colored contact lens 10 with a non-opaque pupil section 20, an iris section surrounding said pupil section 22, and a colored, opaque intermittent pattern over the iris section 24. The pattern 24 leaves a substantial portion within the interstices of the pattern non-opaque and covers at least about 15 percent of the area of the iris section. The elements of the pattern are opaque and undiscernible to the ordinary viewer. The pattern 24 is a starburst pattern located generally on the inner portion of the iris section of the contact lens adjacent to the non-opaque pupil section and having an uneven border at its outer end. The uneven border when measured as a percentage of the iris portion is a minimum distance of about 5% to about 60% of the radial width of said iris section, and the maximum distance of the uneven border from the outer perimeter of said iris section is from about 25% to about 95% of the radial width of said iris section. The pattern provides a lens capable of making subtle changes or enhancements to the color of the iris of a dark-eyed person wearing the lens while still imparting a very natural appearance.

Figure 4:
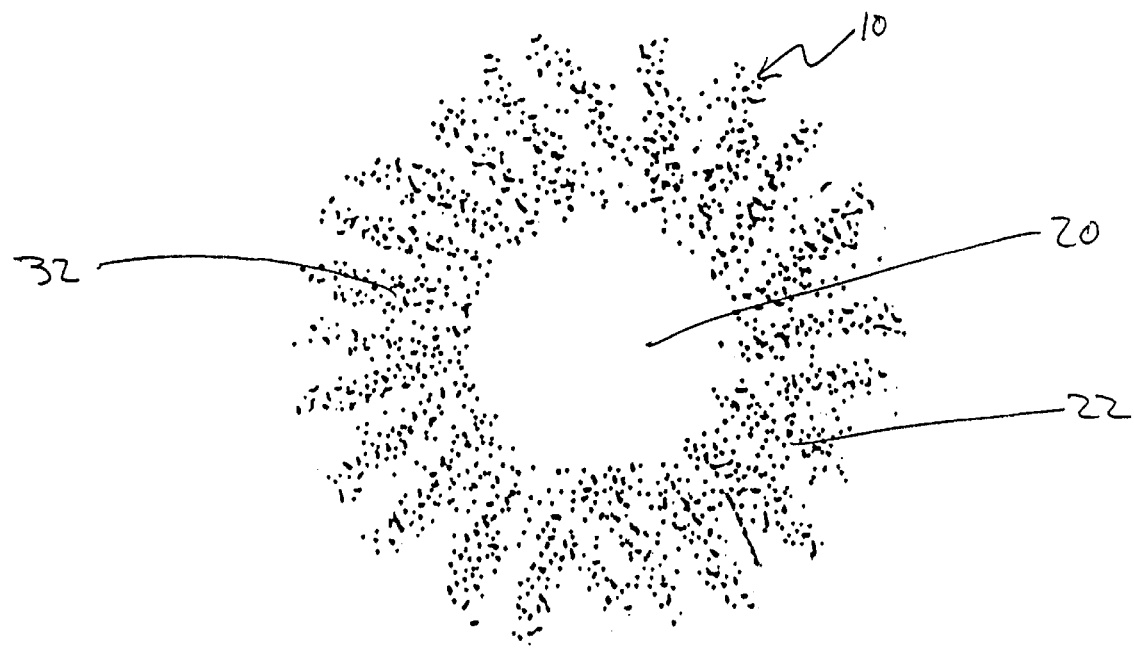
FIG. 4 illustrates a contact lens pattern in accordance with an alternative embodiment of the present invention.

FIG. 4 shows yet another embodiment of the present invention in which a colored contact lens 10 with a non-opaque pupil section 20, an iris section surrounding said pupil section 22, and a colored, opaque, intermittent pattern over the iris section 32. The pattern leaves a substantial portion within the interstices of the pattern non-opaque and covers at least about 15 percent of the area of the iris section. The elements of the pattern are opaque and indiscernible to the ordinary viewed. The pattern is actually two separate patterns, each one a different color, printed on top of each other. It does not matter which pattern is printed first.

One pattern is similar to the pattern shown in FIG. 2 and described above, using radial stripes made up of opaque uniform or non-uniform dots or other shapes. The second pattern is similar to the pattern shown in FIG. 3 and described above, however the preferred embodiment uses non-uniform dots. The uneven border formed by the second pattern uses the same percentages of distance of the iris section as that described above and shown in FIG. 3. These patterns, similar to all the patterns described herein, can be made using either red, mahogany, light hazel or starburst hazel opaque colorant. However, the pattern in FIG. 4 uses two different colors of the above-listed colors, one for each pattern.

Producing the opaque portions of the iris section is preferably accomplished by printing the lens using the known printing process of U.S. Pat. No. 4,582,402 to Knapp, incorporated herein by reference, and the known printing process of U.S. Pat. Nos. 5,034,166 and 5,116,112 to Rawlings, incorporated herein by reference. Generally, a plate or cliche having depressions in the desired pattern is smeared with ink of the desired shade. Excess ink is removed by scrapping the surface of the plate with a doctor blade leaving the depression filled with ink. A silicon rubber pad is pressed against the plate to pick up the ink from the depressions and then is pressed against a surface of the lens to transfer the pattern to the lens. The printed pattern is then cured to render it unremovable from the lens. Of course, either the anterior or posterior surfaces of the lens may be printed, but printing the anterior surface is presently preferred.

The preferred lenses used to practice this invention are known and described in Loshaek's U.S. Pat. No. 4,668,240, incorporated herein by reference. Very briefly, a lens constructed of polymer having —COOH, —OH, or —NH$_2$ groups is printed with ink containing binding polymer as described above. First a solution of binding polymer and solvent is prepared and this solution is mixed with paste containing the coloring substance to form an ink. The preferred binding polymer solutions described in the Loshaek patent have a viscosity of 25,000 CPS. It is currently preferred to form inks for the present lenses from binding polymer solutions having a viscosity of about 40,000 CPS. The opaque ink is printed and cured on the lens surface.

Of course, alternative ways to form colored opaque elements of the lens may be used. For example, selected portions of the iris section of a wetted hydrophilic lens may be impregnated with a solution of a first substance, such as barium chloride. Then the lens may be immersed in a solution of a second substance, such as sulfuric acid, that forms an opaque, water-insoluble precipitate with the first substance, for example barium sulfate. Thus, an opaque precipitate forms within the lens in a predetermined pattern in the iris section. Next all or at least the opaque pattern of the iris section is colored opaque pattern in accordance with the invention. If the entire iris is colored with translucent tint, then the interstices within the pattern will be translucently colored, but still non-opaque and in accordance with the present invention. Optionally, the pupil section of the lens may be colored by a non-opaque tint, because such tint is not visible when the lens is against the dark pupil present in the eye of the wearer. Other alternative opaquing methods include use of a laser (U.S. Pat. No. 4,744,647) and finely ground particles U.S. Pat. No. , 4,460,523.

The process of the present invention for making colored contact lenses is as follows. A transparent contact lens comprising at least a pupil section and an iris section surrounding the pupil section is provided.

If the lens is constructed of a hydrophilic material, it also has a peripheral section surrounding iris section. For hydrophilic material, the steps described below are performed with the material in an unhydrated state. Preferred hydrophilic materials are disclosed by Loshaek in U.S. Pat. No. 4,405,773, incorporated herein by reference.

The colored pattern may be deposited onto iris section of the lens in any manner. The currently preferred method is by offset pad printing, described below in some detail.

A plate (not shown) is prepared having flat surface and circular depressions corresponding to the desired dot pattern. To make the pattern shown in FIGS. 2, 3, 4 and 6 each depression should have a diameter with a range of about 0.05 to 0.15 mm, preferably 0.10 mm, and a depth preferably about 0.013 mm. The depressions are arranged to cover an annular shape corresponding to that of the iris section of the lens.

The plate may be made by a technique that is well known for making integrated analog or digital circuits. First a pattern about 20 times as large as the desired pattern is prepared. Next the pattern is reduced to the required size using well known photographic techniques to a pattern of the exact desired size having the portion to be colored darker than the remaining area. A flat metal surface is covered by a photo resist material which becomes water insoluble when exposed to light. The photo resist material is covered with the pattern and exposed to light. The unnecessary portion of the photo resist pattern is removed by washing with water and the metal plate is etched at the portions not exposed to light to the required depth. Then the remainder of the photoresist material is mechanically removed after the etching process.

Colorant, comprising a pigment and binder or carrier for the pigment is deposited on flat surface of the plate and scraped across the pattern with a doctor blade. This causes depressions to be filled with ink while removing excess ink from flat surface. The colorant may be more or less opaque depending on the degree of color change desired. The opacity may be varied by modifying the proportion of pigment to binder in the colorant. It will be recognized that a desired effect may be obtained using a highly opaque colorant or by having a somewhat less opaque colorant and covering a greater portion of the iris section surface.

A pad made of silicon rubber, impregnated with silicon oil for easy release, is pressed against the pattern, removing ink from depressions. The ink on the pad is allowed to dry slightly as needed to improve tackiness, then pressed against the front surface of the contact lens, depositing the ink in the desired pattern over the iris section. Of course the pad must have enough flexibility to deform to fit over the convex front surface of the lens. The printing could be done in the concave surface of the lens by modifying the shape of the pad and placement of the lens. For a more natural effect, the printing step may be repeated one or more times using different patterns in different colors, since upon close examination, the iris's of many persons are found to contain more than one color. The printed pattern need not be absolutely uniform, allowing for enhancement of the fine structure of the iris. A more natural appearance may be obtained by printing on both the concave and convex sides of the lens.

Next the deposited pattern is treated to render it resistant to removal from the lens under exposure to the ocular fluids that the lens will encounter when placed in the eye and when lens cleaning takes place. The exact method of preventing removal depends on the material of construction of the lens and the pattern. Mere air drying or heating the lens may suffice. For hydrophilic lenses, the techniques for coating the opaque pattern described in Wichterle, U.S. Pat. No. 3,679,504 (incorporated herein by reference), may be used.

The method for manufacturing a colored contact lens in accordance with the present invention generally includes the steps of applying colorant to the surface of a transparent contact lens and rendering the colorant resistant to removal from ocular fluids. The printed contact lens will have a non-opaque pupil section and an iris section surrounding said pupil section with the pattern of the present invention.

The steps used in order to deposit the intermittent pattern on the lens surface require a plate having depressions corresponding to the patterns described in detail above, and filling the depressions with colorant of the required shade. In the preferred embodiment the colorant or shade is either red, mahogany, light hazel or starburst hazel. Then, pressing a flexible pad against the plate and subsequently pressing the flexible pad against the surface of the lens (either side) thereby printing the patterns on the lens. In the case where two patterns are contemplated, two separate printings using the different patterns and different colors must be utilized.

It can be seen that the present invention provides lenses capable of providing a subtle change or enhancement to the iris of a dark-eyed person while allowing visualization of the fine structure thereof and providing a natural appearance. Various changes may be made in the function and arrangement of parts: equivalent means may be substituted for those illustrated and described; and certain features may be used independently from others without departing from the spirit and scope of the invention as defined in the following claims.

What is claimed is:

1. A colored contact lens comprising a non-opaque pupil section, an iris section surrounding said pupil section, and a colored, opaque intermittent pattern over said entire iris section that leaves a substantial portion within the interstices of the pattern non-opaque, said pattern being made up of elements and covering at least about 15 percent of the area of said iris section, the elements of said pattern being opaque and indiscernible to the ordinary viewer, thereby providing a contact lens capable of making a subtle change and enhancing the color of the iris of a dark-eyed person wearing the lens while imparting a very natural appearance.

2. The colored contact lens in accordance with claim 1, wherein the elements of the pattern are dots thereby providing a contact lens capable of making a subtle change or enhancement to the iris of a dark-eyed person wearing the lens while imparting a very natural appearance.

3. The colored contact lens in accordance with claim 1, wherein the elements of the pattern are not uniform, thereby providing a contact lens capable of making a subtle change or enhancement to the iris of a dark-eyed person wearing the lens while imparting a very natural appearance.

4. The colored contact lens in accordance with claim 1, wherein the non-opaque portion is uncolored.

5. The colored contact lens in accordance with claim 1, wherein the non-opaque portion is translucently colored.

6. The colored contact lens in accordance with claim 1, wherein said colored contact lens is hydrophilic.

7. A colored contact lens comprising a non-opaque pupil section, an iris section surrounding said pupil section, and a colored, opaque intermittent pattern over said iris section that leaves a substantial portion of the pattern non-opaque, said pattern being made up of elements and covering at least about 15 percent of the area of said iris section, the elements of said pattern being opaque and indiscernible to the ordinary viewer, said pattern made up of a plurality of radial stripes extending from the non-opaque pupil section to the periphery of the iris section, each radial stripe being bounded on each side by a non-opaque iris portion, such that each non-opaque iris portion and each radial stripe cover the same approximate area, thereby providing a lens capable of making a subtle change and enhancing the color of the iris of a person having dark colored eyes while providing a natural appearance.

8. The colored contact lens in accordance with claim 7, wherein the elements of the pattern are dots thereby providing a contact lens capable of making a subtle change or enhancement to the iris of a dark-eyed person wearing the lens while imparting a very natural appearance.

9. The colored contact lens in accordance with claim 7, wherein the elements of the pattern are not uniform, thereby providing a contact lens capable of making a subtle change or enhancement to the iris of a dark-eyed person wearing the lens while imparting a very natural appearance.

10. The colored contact lens in accordance with claim 7, wherein said colored contact lens is hydrophilic.

11. A colored contact lens comprising a non-opaque pupil section, an iris section surrounding said pupil section, and a colored, opaque intermittent pattern over said iris section that leaves a substantial portion of the pattern non-opaque, said pattern being made up of elements and covering at least about 15 percent of the area of said iris section, the elements of said pattern being opaque and indiscernible to the ordinary viewer, said pattern comprising two portions, a first portion having a first shade, and a second portion having a second shade being different from said first shade, said first portion having an uneven border, said uneven border having a minimum and maximum distance from the outer perimeter of said iris section, said minimum distance of said uneven border from the outer perimeter of said iris section being from about 5% to about 60% of the radial width of said iris section, and the maximum distance of said uneven border from the outer perimeter of said iris section being from about 25% to about 95% of the radial width of said iris section, said second portion having a plurality of radial stripes extending from the non-opaque pupil section to the periphery of the iris section, each radial stripe being bounded on each side by a non-opaque iris portion, such that each non-opaque iris portion and each radial stripe cover the same approximate area, thereby providing a lens capable of making a subtle change and enhancing the color of the iris of a person having dark colored eyes while providing a natural appearance.

12. The colored contact lens in accordance with claim 11, wherein the non-opaque substantial portion is uncolored.

13. The colored contact lens in accordance with claim 11, wherein the non-opaque substantial portion is translucently colored.

14. The colored contact lens in accordance with claim 11, wherein said colored contact lens is hydrophilic.

15. A method for manufacturing a colored contact lens comprising providing a transparent contact lens, applying colorant to the surface of said contact lens, and rendering the colorant resistant to removal by ocular fluids, wherein the contact lens has a non-opaque pupil section and an iris section surrounding said pupil section, said iris section having a colored opaque intermittent pattern which leaves a substantial portion within the interstices of the pattern non-opaque, said pattern made up of elements and covering at least about 15 percent of the area of said iris section, the elements of said pattern being opaque and indiscernible to the ordinary viewer, thereby providing a contact lens capable of making a subtle change and enhancing the color of the iris of a dark-eyed person wearing the lens while imparting a very natural appearance, wherein the intermittent pattern is deposited on the lens surface by the steps of:

a) providing a plate having depressions corresponding to said pattern;

b) filling the depressions with a colorant;

c) pressing a flexible pad against the plate;

d) pressing the flexible pad against a surface of the lens thereby printing the pattern on the contact lens such that said pattern covers at least about 15 percent of the area of said iris section; and e) rendering the colorant resistant to removal by ocular fluids.

16. The method for manufacturing a colored contact lens in accordance with claim 15 wherein the colored contact lens is hydrophilic.

17. The method for manufacturing a colored contact lens in accordance with claim 15 wherein the non-opaque section is translucently colored.

18. A method for manufacturing a colored contact lens having a non-opaque pupil section, an iris section surrounding said pupil section, and a colored, opaque intermittent radial stripe pattern over said iris section that leaves a substantial portion of the pattern non-opaque, said pattern made up of elements and covering at least about 15 percent of the area of said iris section, said elements of said pattern being opaque and indiscernible to the ordinary viewer, said pattern being made up of a plurality of radial stripes extending from the non-opaque pupil section to the periphery of the iris section, each radial stripe being bounded on each side by a non-opaque iris portions, such that each non-opaque iris portion and each radial stripe cover the same approximate area, thereby providing a lens capable of making a subtle change and enhancing the color of the iris of a person having dark colored eyes, comprising the steps of:

a) providing a plate having depressions corresponding to said radial stripe pattern stretching from the periphery of the non-opaque pupil section to the periphery of the iris section;

b) filling the depressions with colorant;

c) pressing a flexible pad against the plate;

d) pressing the flexible pad against a surface of the contact lens thereby printing the radial stripe pattern on the contact lens; and e) rendering the colorant resistant to removal by ocular fluids.

19. The method for manufacturing a colored contact lens in accordance with claim 18, wherein the radial stripe pattern is translucently colored.

20. The method for manufacturing a colored contact lens in accordance with claim 18, wherein the colored contact lens is hydrophilic.

* * * * *